W. H. ANDERSON.
NUT LOCK.
APPLICATION FILED FEB. 18, 1915.
1,162,543.
Patented Nov. 30, 1915.
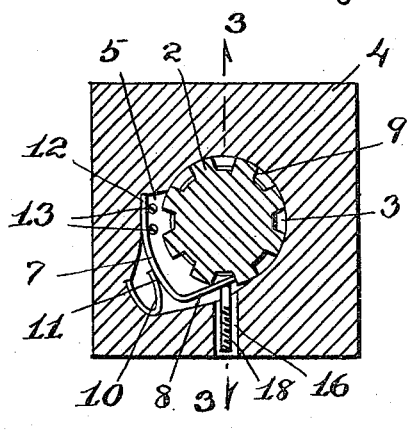
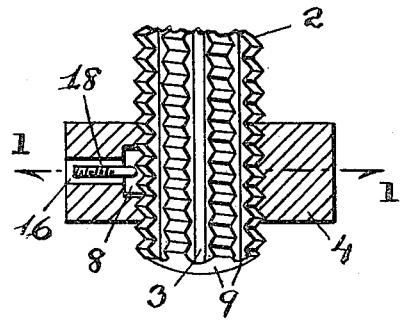
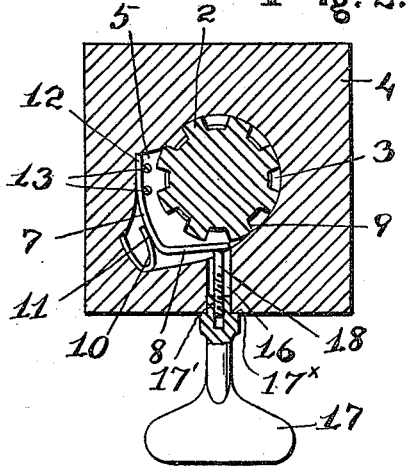
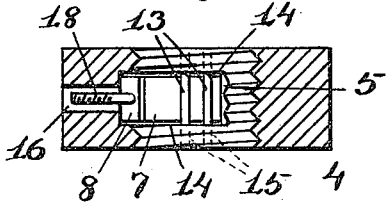
Witnesses
Stuart Hilder.
Frances W. Anderson.
Inventor,
William H. Anderson.
By
E. W. Anderson & Son
his Attorneys

UNITED STATES PATENT OFFICE.

WILLIAM H. ANDERSON, OF CLARKSBURG, WEST VIRGINIA, ASSIGNOR OF ONE-HALF TO OTTO W. SMITH, OF CLARKSBURG, WEST VIRGINIA.

NUT-LOCK.

1,162,543.  Specification of Letters Patent.  Patented Nov. 30, 1915.

Application filed February 18, 1915. Serial No. 9,099.

*To all whom it may concern:*

Be it known that I, WILLIAM H. ANDERSON, a citizen of the United States, resident of Clarksburg, in the county of Harrison and State of West Virginia, have made a certain new and useful Invention in Nut-Locks; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a section on the line 1—1, Fig. 3. Fig. 2 is a similar view with the key applied and the lock released. Fig. 3 is a section on the line 3—3, Fig. 1. Fig. 4 is a similar view with the bolt removed.

The invention has relation to nut-locks, having for its object the provision of a simple and efficient spring lock that will not work loose, and wherein danger of breakage will be reduced to a minimum, the device having no protruding parts and being releasable at will.

Other objects and advantages will hereinafter appear.

The invention consists in the novel construction and combinations of parts, as hereinafter set forth.

In the accompanying drawings, illustrating the invention, the numeral 2 designates a threaded bolt, wherein longitudinal channels 3 are provided, intersecting the threads of the bolt but not interfering with the engagement of the nut 4 therewith. In said nut is made an inner lateral recess 5, opening upon the inside toward the bolt, and located in said recess is a spring pawl 7, made of flat metal and having an operative free end 8 normally engaging the ratchet shoulders or teeth 9 of the bolt channels.

In order to maintain the free end of the spring pawl normally in positive engagement with the ratchet teeth of the bolt, a heel spring 10 of U form is located in the recess 5, in rear of the spring pawl and about midway of the length of the pawl, said heel spring bearing at one side against the wall of the recess and at the other side against the outer end of the curved body of the spring pawl at 11, in rear of the free end portion 8 of the pawl, said free end portion being preferably straight and extending tangentially to the bolt and at about right angles to the shoulder 9 of the bolt, with which it is in engagement, said curved body being substantially concentric with the bolt. The engagement of the pawl with the shoulder is in this way rendered more positive, while the proper flexibility of the pawl is provided for, the heel spring allowing the curved body portion 10 of the pawl to yield when necessary, but normally stiffening its action.

The fixed end portion of the spring pawl is indicated at 12, and is usually secured in position against the wall of the lateral recess 5 by means of cross-pins 13, engaging the front or outer face of said fixed end portion and secured solidly in place in perforations 15 of the side walls 14 of the recess 5, whereby the spring is not required to be perforated, and consequently weakened, for securing pins.

The free end of the spring is provided with an outward-projecting screw-threaded stem 18, loosely engaging an aperture 16 of the side of the nut, said aperture communicating with the lateral recess 5. The threaded stem is normally located wholly within said aperture, and may be engaged by a removable threaded key 17, when it is desired to move the free end of the pawl from engagement with the longitudinal channels of the bolt, said key being made removable so that the lock may not be released accidentally or by mischievous persons.

The key is provided with a reduced hollow internally threaded end 17', fitting within the aperture 16 of the nut and engaging the threaded end of the stem, said key having a shoulder 17× bearing against the side of the nut, to effect a quick release of the spring pawl.

I claim:

In a nut lock, a longitudinally grooved bolt, a nut having an inner lateral recess, a pawl of spring metal within said recess having a curved body substantially concentric with the bolt, and a straight work end tangential to said bolt and engaging the grooves thereof, said pawl having an obtuse-angle bend at the joint between the straight end and the curved body thereof, and a pressure spring in said recess having contact with the outer end of said curved body of the pawl.

In testimony whereof I affix my signature in presence of two witnesses.

WILLIAM H. $\overset{\text{his}}{\times}$ ANDERSON.
mark

Witnesses:
HARRY DECK,
ELLA G. STUTLER.

Copies of this patent may be obtained for five cents each, by addressing the "Commissioner of Patents, Washington, D. C."